United States Patent

Dhurjaty

[11] Patent Number: 5,260,561
[45] Date of Patent: Nov. 9, 1993

[54] NOISE REDUCTION IN A STORAGE PHOSPHOR DATA ACQUISITION SYSTEM

[75] Inventor: Sreeram Dhurjaty, Rochester, N.Y.

[73] Assignee: Eastman Kodak Company, Rochester, N.Y.

[21] Appl. No.: 965,657

[22] Filed: Oct. 23, 1992

[51] Int. Cl.⁵ .......................... G03G 5/16; H01J 40/14
[52] U.S. Cl. .................. 250/214 C; 250/234; 250/205; 250/582
[58] Field of Search ............... 250/214 C, 214 R, 205, 250/208.1, 327.2, 327.2 G, 327.2 D–327.2 F, 234–236, 214 AG

[56] References Cited

U.S. PATENT DOCUMENTS

| Re. 31,847 | 3/1985 | Luckey | 250/327.2 |
|---|---|---|---|
| 4,150,402 | 4/1979 | Tietze et al. | 358/280 |
| 4,410,799 | 10/1983 | Okamoto | 250/327.2 |
| 4,743,759 | 5/1988 | Boutet | 250/327.2 |
| 4,757,199 | 7/1988 | Horikawa | 250/327.2 G |
| 4,861,994 | 8/1989 | Saotome et al. | 250/327.2 G |
| 4,868,388 | 9/1989 | Horikawa | 250/327.2 G |
| 4,885,467 | 12/1989 | Hurikawa | 250/327.2 G |
| 4,896,222 | 1/1990 | Fukai | 358/446 |
| 4,914,294 | 4/1990 | Fukai et al. | 250/327.2 E |
| 4,922,100 | 5/1990 | Takchehi | 250/327.2 D |
| 4,977,322 | 12/1990 | Agano et al. | 250/327.2 |

Primary Examiner—David C. Nelms
Assistant Examiner—Michael Messinger
Attorney, Agent, or Firm—William F. Noval

[57] ABSTRACT

A laser imaging system, such as a storage phosphor laser imaging system, includes a correction circuit for correcting laser noise in a scanned image signal.

5 Claims, 2 Drawing Sheets

NOISE REDUCTION IN A STORAGE PHOSPHOR DATA ACQUISITION SYSTEM

FIELD OF THE INVENTION

This invention relates in general to laser imaging systems and, more particularly, to storage phosphor systems in which data acquired from a storage phosphor by laser scanning is corrected for laser noise.

BACKGROUND OF THE INVENTION

In a storage phosphor imaging system, as described in U.S. Pat. No. Re. 31,847, reissued Mar. 12, 1985 to Luckey, a storage phosphor is exposed to an x-ray image of an object to record a latent image in the storage phosphor. The latent x-ray image is read out by stimulating the storage phosphor with a relatively long wavelength simulating radiation, such as red or infrared light. Upon stimulation, the storage phosphor releases emitted radiation of an intermediate wavelength, such as blue light, in proportion to the quantity of x-rays that were received. To produce a signal useful in electronic image processing, the storage phosphor is scanned in a raster pattern by a laser beam deflected by an oscillating or rotating scanning mirror. The emitted radiation from the storage phosphor is collected by a light collector and detected by a photodetector, such as a photomultiplier to produce an electronic image signal. Typically, the storage phosphor is translated in a page scan direction past a laser beam, that is repeatedly deflected in a line scan direction perpendicular to the motion of storage phosphor to form a scanning raster.

In order to optimize a signal-to-noise ratio of the imaging system, it is desirable to collect as much of the emitted light as possible, and to direct it to the photodetector. An easily manufacturable, low-cost, high-efficiency light collector is disclosed in commonly assigned U.S. Pat. No. 4,743,759, issued May 10, 1988, inventor John C. Boutet. Even though the light collected for detection by a photodetector may be collected highly efficiently, noise components are introduced into the detected image signal by the scanning laser beam. The noise fluctuations in the scanning laser beam cause the light emitted from the storage phosphor to also fluctuate, introducing false readings in the detected image signal. A proposal to reduce the effects of laser induced noise described in U.S. Pat. No. 4,410,799 issued Oct. 19, 1983, inventor Okamoto. As disclosed in the latter patent, a radiation image information readout apparatus reads out a stimulable phosphor in which a radiation image is recorded by use of stimulating rays impinging thereon. The gain of the readout system is controlled, according to a fluctuation of the intensity of the stimulating ray source, by use of an additional photodetector, which detects the laser intensity before the stimulable phosphor is scanned. A similar system is disclosed in U.S. Pat. No. 4,150,402, issued Apr. 17, 1979, inventors Tietze et al, in which the effect of laser noise in a scanning laser read system is reduced by sampling the laser beam prior to scanning a document. The sampled laser beam is converted to an electrical signal which is amplified and applied to a gain control device, such that noise present in the output laser beam modulates the signal detected from scanning the document to eliminate laser noise.

Another proposal to reduce laser generated noise in a storage phosphor system is disclosed in U.S. Pat. No. 4,896,222, issued Jan. 23, 1990, inventor Fukai. As disclosed in the latter patent, an object such as a stimulable phosphor sheet, on which image information is recorded, is scanned by a laser beam, and emitted light is photoelectrically detected to produce an image signal representing the image formation. A monitor signal representing the light beam is detected by a photodetector and is divided into a high frequency component and a low frequency component. A corrective signal is produced by multiplying a ratio of the high frequency component to the low frequency component by a constant. This corrective signal is then subtracted from the image signal.

U.S. Pat. No. 4,977,322, issued Dec. 11, 1990, inventors, Agano et al., discloses a technique to minimize image signal noise in a stimulable phosphor system. As disclosed, a detected image signal is fed to a high frequency component decreasing device for decreasing the high frequency component, the level of the image signal is detected, and the high frequency component of the image signal is decreased by the high frequency component decreasing device, in accordance with a decrease in the level of the image signal.

There is thus a problem in the prior art of laser beam scanning systems to correct for signal fluctuations in a scanned image produced by noise in the scanning laser beam.

SUMMARY OF THE INVENTION

According to the present invention, there is provided a solution to the problem of laser noise in known laser imaging systems. In a laser imaging system including a laser which produces a laser beam and means for scanning an image medium with said laser beam to produce a scanned image, a laser noise correction apparatus according to the present invention comprises: a first photodetector for detecting the scanned image and for producing an image signal; a second photodetector for detecting the laser output beam, and for producing a reference signal, wherein the image signal and the reference signal contain a laser noise part; first analog-to-digital converter means for converting said image signal to a digital image signal; means for subtracting a predetermined non-varying part of the laser signal from the reference signal to produce a residue reference signal representative of laser noise; means for amplifying the residue reference signal by a factor N; second analog-to-digital converter means for converting the residue reference signal to a digital residue reference signal; means for dividing the digital residue reference signal by said factor N; means for combining the divided digital residue reference signal with a digital signal representative of the non-varying part of the reference signal; means for converting the combined digital reference signal and the digital image signal into respective digital log reference signal and digital log image signal; and means for subtracting the digital log reference signal from the digital log image signal to produce a digital log corrected image signal.

DETAILED DESCRIPTION OF THE PREFERRED EMBODIMENTS

Although the laser noise correction technique of the present invention will be described in detail hereinafter as incorporated in a storage phosphor laser imaging system, it will be understood that the present invention is more broadly applicable to other types of laser imaging systems which require correction for laser noise.

Figure 1:
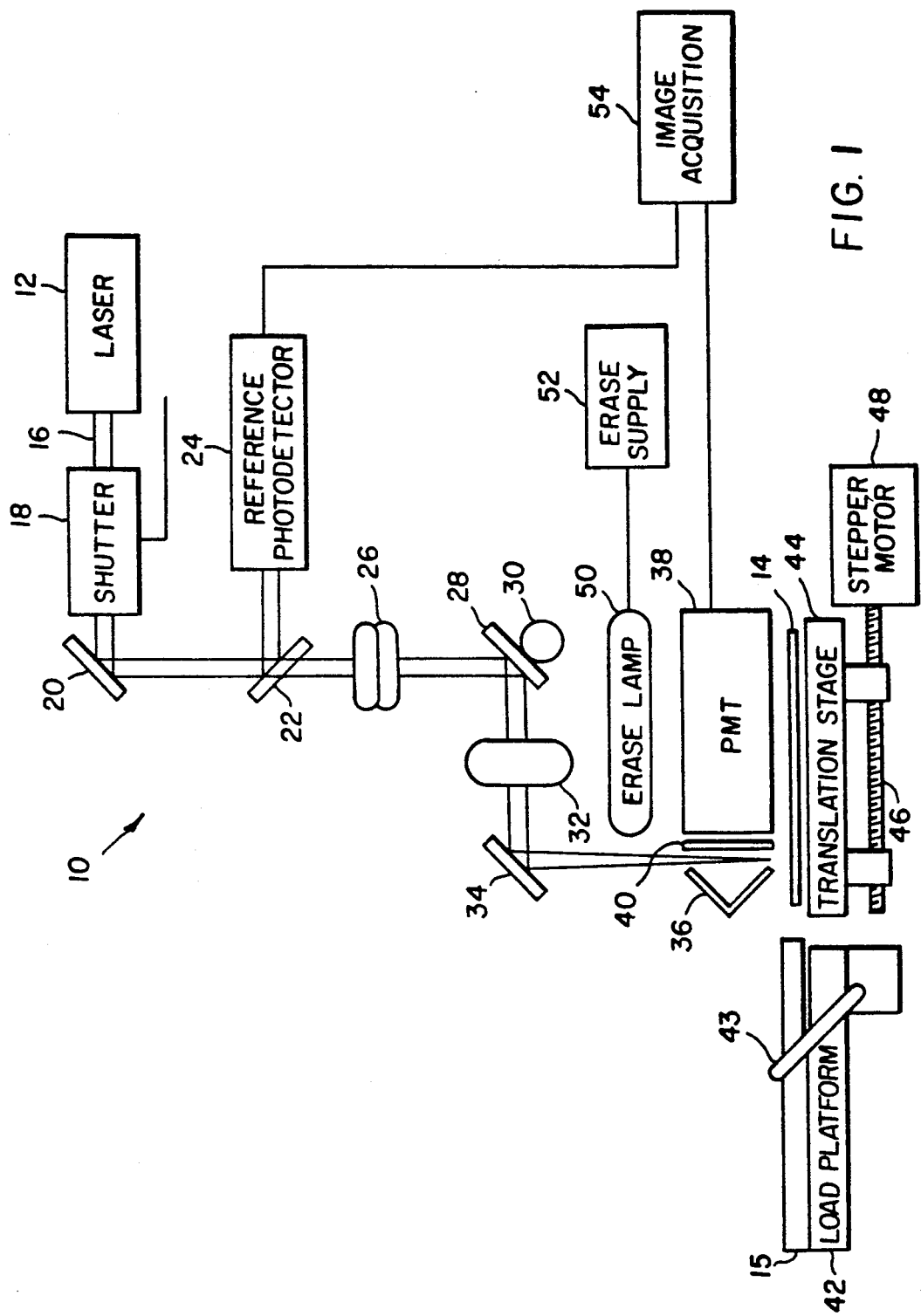
FIG. 1 is a diagrammatic view of a storage phosphor laser imaging system incorporating an embodiment of the present invention.

Referring now to FIG. 1, there is shown a diagrammatic view of a storage phosphor laser imaging system incorporating an embodiment of the present invention. As shown in FIG. 1, storage phosphor laser imaging system 10 includes a laser 12, such as a helium neon gas laser, for stimulating a storage phosphor screen 14. Laser 12 produces a laser beam 16, which passes through a shutter 18, which is open during a storage phosphor reading operation and closed at other times. The laser beam 16 is reflected by mirror 20 through beam splitter 22, which directs a portion of the laser beam 16 to reference photodetector 24. Following the beam splitter, laser beam 16 passes through collimator 26. The collimated beam is deflected by an oscillating mirror 28 driven by galvanometer motor 30, which provides a raster motion of the laser beam 16.

An F-THETA lens 32 produces a flat field of focus and constant linear velocity at the plane of storage phosphor 14. The laser beam is reflected by folding mirror 34, which directs the beam through light collector 36 onto storage phosphor 14. The stimulating laser beam causes storage phosphor 14 to emit light which is collected by light collector 36 which directs the emitted light onto photomultiplier (PMT) 38. A filter 40 in front of PMT 38 blocks scattered laser light and passes emitted light to PMT 38.

A cassette 15 containing a storage phosphor 14 is placed on cassette load platform 42 and the load lever 43 is rotated to clamp the storage phosphor cassette 15 in place. A storage phosphor extraction mechanism (not shown) extracts the storage phosphor 14 from the cassette 15 onto translation stage 44. Translation stage 44 is driven by a mechanism 46 actuated by stepper motor 48. The translation stage 44 is moved in a direction perpendicular to the loading direction to a point under collector 36, at which point data acquisition begins through stimulation by laser beam 16. As the storage phosphor 14 is moved under the laser beam 16, a raster scan is produced of the latent image stored in storage phosphor 14.

At the end of the scan, as determined by the number of image lines of the storage phosphor 14, the PMT 38 and galvo motor 30 are turned off, and translation stage 44 is returned to a home position opposite cassette load platform 42.

Immediately after translation stage 44 reaches the home position, erase lamp 50, driven by erase power supply 52, is turned on to erase storage phosphor 14. Following a predetermined erase period, erase lamp 50 is turned off, and the storage phosphor screen extraction mechanism returns storage phosphor 14 to cassette 15. The load lever 44 is then rotated to unlock cassette 15 for removal.

Figure 2:
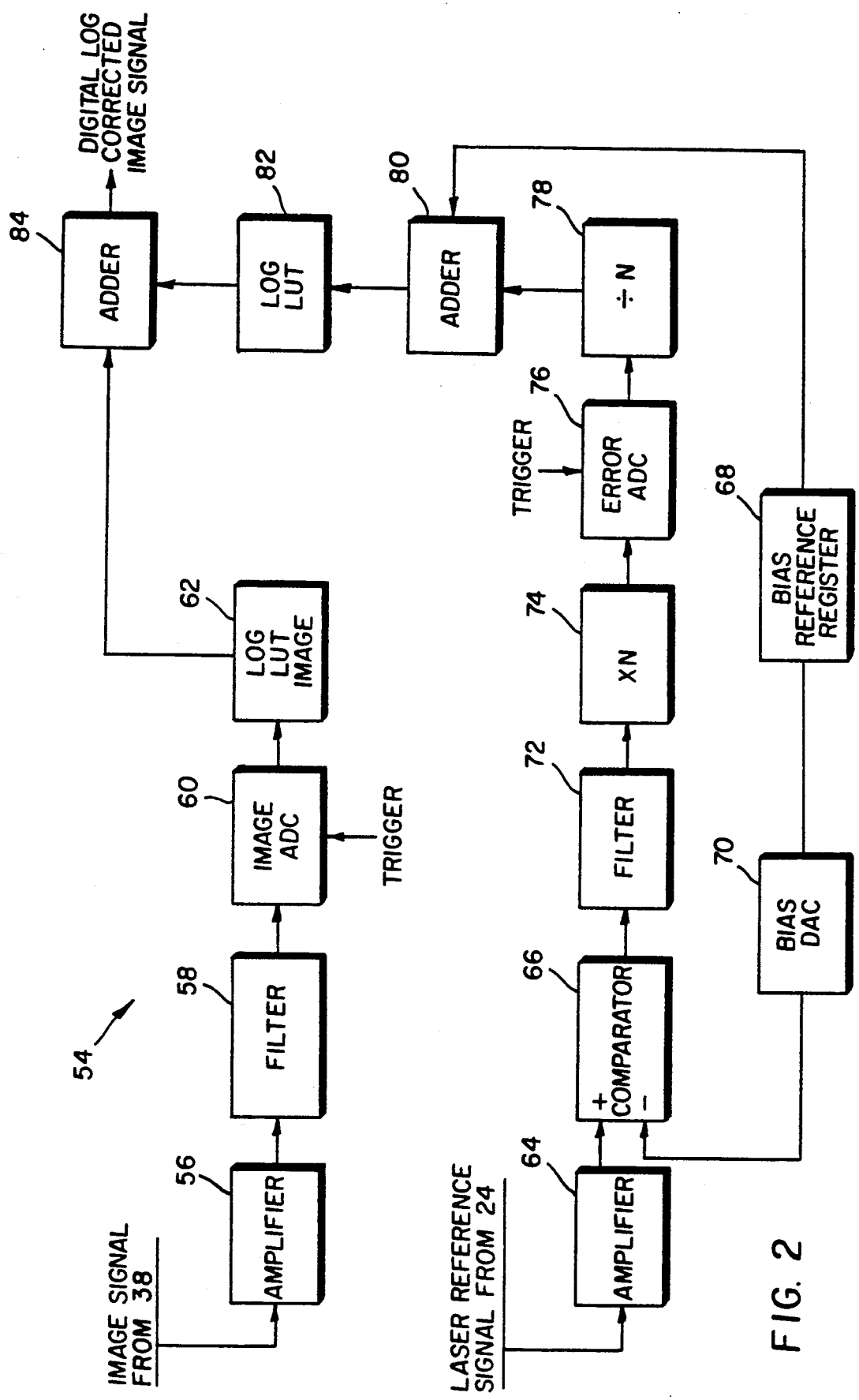
FIG. 2 is a schematic diagram of an embodiment of the present invention incorporated in the system of FIG. 1.

The image signal from PMT 38 and reference signal from reference photodetector 24 are sent to image acquisition circuit 54, which will be described in detail with reference to FIG. 2. As shown in FIG. 2, the image signal is applied to a variable gain transconductance amplifier 56, which transforms the current signal from PMT 38 into a voltage signal. The gain of amplifier 56 can be varied under computer control in order to accommodate varying storage screen sizes as well as varying scanning speeds. The voltage from amplifier 56 is input to the Bessel filter 58. Filter 58 is an anti-aliasing filter (typically a 4-pole low-pass filter) with Bessel response, in order to maintain the shape of the signal input from amplifier 56. Filter 58 also effects a slight time delay of the image signal from amplifier 56. The analog output of filter 58 is converted to a digital signal by analog-to-digital converter (ADC) 60. ADC 60 may, for example, be a 16 bit flash converter. The output of ADC 60 is input to a log lookup table (LUT) 62, which produces a log digital image signal.

Since the image signal contains a noise component caused by fluctuations in the output laser beam, according to the present invention, a correction signal is subtracted from the image signal to produce a corrected image signal.

The correction signal is derived from the laser reference signal from photodetector 24, which is amplified by amplifier 64. Amplifier 64 converts the reference current signal from photodetector 24 into a reference voltage signal, which is applied to the noninverting input of comparator 66. Comparator 66 also receives a bias signal representing the known non-varying portion of the reference signal voltage. The bias reference signal is stored as a digital signal in bias reference register 68. Register 68 supplies a digital signal to bias DAC 70, which produces the analog bias reference voltage applied to comparator 66. As an example, laser noise is approximately 1% of the total laser reference signal. Therefore, DAC 70 produces the non-varying reference bias voltage, which represents 99% of the laser intensity. This bias voltage is subtracted from the reference signal, and comparator 66 produces a residue reference signal, which represents the laser noise. The residue reference signal is passed through a Bessel filter 72, which has the same characteristics as Bessel filter 58 in the image signal channel. Thus, time delays of the reference and the image signal are equalized before digitization. Bessel filter 72 can also be located before comparator 66 to achieve the same equalization.

The filtered reference signal is amplified by amplifier 74 by a factor $N = 2^M$, and the amplified reference signal converted to a digital signal by error ADC 76, which may, for example, be a 7 bit ADC. ADC 76 is triggered by the same trigger signal as ADC 60.

The signal from ADC 76 is divided by a factor N by divider circuit 78. Division is effected by shifting the signal to the right by M places. The digital residue reference signal is then added in adder 80 with the bias reference signal (which represents the non varying part of the laser reference signal) from bias reference register 68 to generate, for example, a 13 bit reference signal representing the laser intensity.

The signal from adder 80 is linear and is converted to a log digital error signal by log LUT 82, which produces, for example, a 9 bit log correction signal. Adder 84 combines the 12 bit log image signal and 9 bit log correction signal to produce a 12 bit log corrected image signal.

The present invention has the following advantages:
 a) digitization of signal data is in linear space, which is then converted to log space using lookup tables;
 b) a novel technique to digitize the laser noise by subtracting the fixed non-varying portion of the laser signal and then digitizing the residue signal in order to accurately digitize the laser intensity using an inexpensive analog-to-digital converter of, e.g., 7 bits of resolution;

c) equalization of time delays between the laser reference signal and the image signal from PMT 38 before digitization;

d) compensation of the image signal for effects of laser noise in the log space using digital circuitry; and e) the ability to read laser power as a, e.g., 13 bit digital number directly from the image acquisition circuit, thus allowing monitoring of laser aging.

Although the invention has been described with reference to preferred embodiments thereof, it will be understood that variations and modifications can be effected within the spirit and scope of the invention, as described above and as defined in the appended claims.

What is claimed is:

1. In a laser imaging system, including a laser which produces a laser beam and means for scanning an image medium with said laser beam to produce a scanned image; a laser noise correction apparatus comprising:

first photodetector means for detecting said scanned image and for producing an image signal;

second photodetector means for detecting said laser output beam, and for producing a reference signal wherein said image signal and said reference signal both contain a laser noise part;

first analog-to-digital converter means for converting said image signal to a digital image signal;

means for subtracting a predetermined non-varying part of the laser signal from the reference signal to produce a residue reference signal representative of laser noise;

means for amplifying the residue reference signal by a factor N;

second analog to digital converter means for converting the residue reference signal to a digital residue reference signal;

means for dividing the digital residue reference signal by said factor N;

means for combining the divided digital residue reference signal with a digital signal representative of the non-varying part of the reference signal;

means for converting the combined digital reference signal and the digital image signal into respective digital log reference signal and digital log image signal; and means for subtracting the digital log reference signal from the digital log image signal to produce a digital log corrected image signal.

2. The laser noise correction apparatus of claim 1 including filter means for delaying, by equal periods, the image signal and the reference signal.

3. The apparatus of claim 2, wherein said filter means are Bessel filters.

4. The apparatus of claim 1, wherein said log converting means includes a log lookup table for said digital image signal and a log lookup table for said digital reference signal.

5. The apparatus of claim 1, wherein said first photodetector means detects a scanned image which is an image formed from emitted light produced by scanning a storage phosphor having a latent x-ray image with a laser beam of stimulating light.

* * * * *